US010710493B2

(12) United States Patent
Kerley et al.

(10) Patent No.: US 10,710,493 B2
(45) Date of Patent: Jul. 14, 2020

(54) CARGO BLANKET SPREADING APPARATUS AND METHOD

(71) Applicant: KNW Automation, LLC, Melrose Park, IL (US)

(72) Inventors: Michael Kerley, River Grove, IL (US); Adam Newman, Westmont, IL (US); Benjamin G. Witek, Downers Grove, IL (US)

(73) Assignee: KNW Automation, LLC, Melrose Park, IL (US)

( * ) Notice: Subject to any disclaimer, the term of this patent is extended or adjusted under 35 U.S.C. 154(b) by 255 days.

(21) Appl. No.: 15/965,843

(22) Filed: Apr. 28, 2018

(65) Prior Publication Data

US 2019/0329697 A1    Oct. 31, 2019

(51) Int. Cl.
| | |
|---|---|
| B60P 7/08 | (2006.01) |
| B65H 75/42 | (2006.01) |
| B65H 75/44 | (2006.01) |
| B62B 3/00 | (2006.01) |
| B62B 5/04 | (2006.01) |
| B62B 5/00 | (2006.01) |
| B66D 3/00 | (2006.01) |
| B66D 1/12 | (2006.01) |
| B60T 1/14 | (2006.01) |

(52) U.S. Cl.
CPC .............. *B60P 7/0876* (2013.01); *B60T 1/14* (2013.01); *B62B 3/00* (2013.01); *B62B 5/00* (2013.01); *B62B 5/049* (2013.01); *B65H 75/425* (2013.01); *B65H 75/4486* (2013.01); *B66D 1/12* (2013.01); *B66D 3/00* (2013.01); *B62B 2202/025* (2013.01); *B62B 2301/044* (2013.01); *B62B 2301/046* (2013.01)

(58) Field of Classification Search
CPC . B60P 7/0876; B60T 1/14; B62B 3/00; B62B 5/00; B62B 5/049; B62B 2202/025; B62B 2301/044; B62B 2301/046; B65H 75/425; B65H 75/4486; B66D 1/12; B66D 3/00
See application file for complete search history.

(56) References Cited

U.S. PATENT DOCUMENTS 2,455,237 A * 11/1948 Davis ................... B60P 7/0876
                                                    410/97
5,050,924 A *  9/1991 Hansen ................. B60P 7/0876
                                                  296/100.15

(Continued)

*Primary Examiner* — Lori L Lyjak
(74) *Attorney, Agent, or Firm* — Riley Intellectual Property Law, LLC

(57) ABSTRACT

Apparatus for covering product containers loaded in a cargo container is disclosed. The apparatus includes an automated cord reel including a spool and a motor configured to drive the spool. The spool when activated reels in a cord attached to a cargo blanket to spread the cargo blanket over product containers in the cargo container in a smooth motion and/or relatively constant speed to prevent snagging on the product containers. The automated cord reel may be configured as a mobile unit with wheels. A brake system may be provided to prevent movement of the automated cord reel during operation. The automated cord reel may have a battery to provide electric power to the motor. A magnetic floor brake may be configured to hold a cart body in a selected position.

29 Claims, 4 Drawing Sheets

(56) References Cited

U.S. PATENT DOCUMENTS

| | | | | |
|---|---|---|---|---|
| 7,471,000 B1* | 12/2008 | Ruiz | ................ | H02J 7/1415 |
| | | | | 290/1 A |
| 7,971,898 B2* | 7/2011 | Wise | ................ | B25H 1/04 |
| | | | | 108/79 |
| 9,592,742 B1* | 3/2017 | Sosinov | ................ | G05D 1/0225 |
| 9,793,699 B2* | 10/2017 | Yun | ................ | H02G 11/02 |
| 2004/0045223 A1* | 3/2004 | Deskin | ................ | B60J 11/00 |
| | | | | 52/3 |
| 2010/0013177 A1* | 1/2010 | Horn, Jr. | ................ | B62B 5/0013 |
| | | | | 280/47.24 |
| 2013/0098725 A1* | 4/2013 | Yun | ................ | H02G 11/02 |
| | | | | 191/12.2 A |
| 2018/0272915 A1* | 9/2018 | Young | ................ | B60P 7/10 |

* cited by examiner

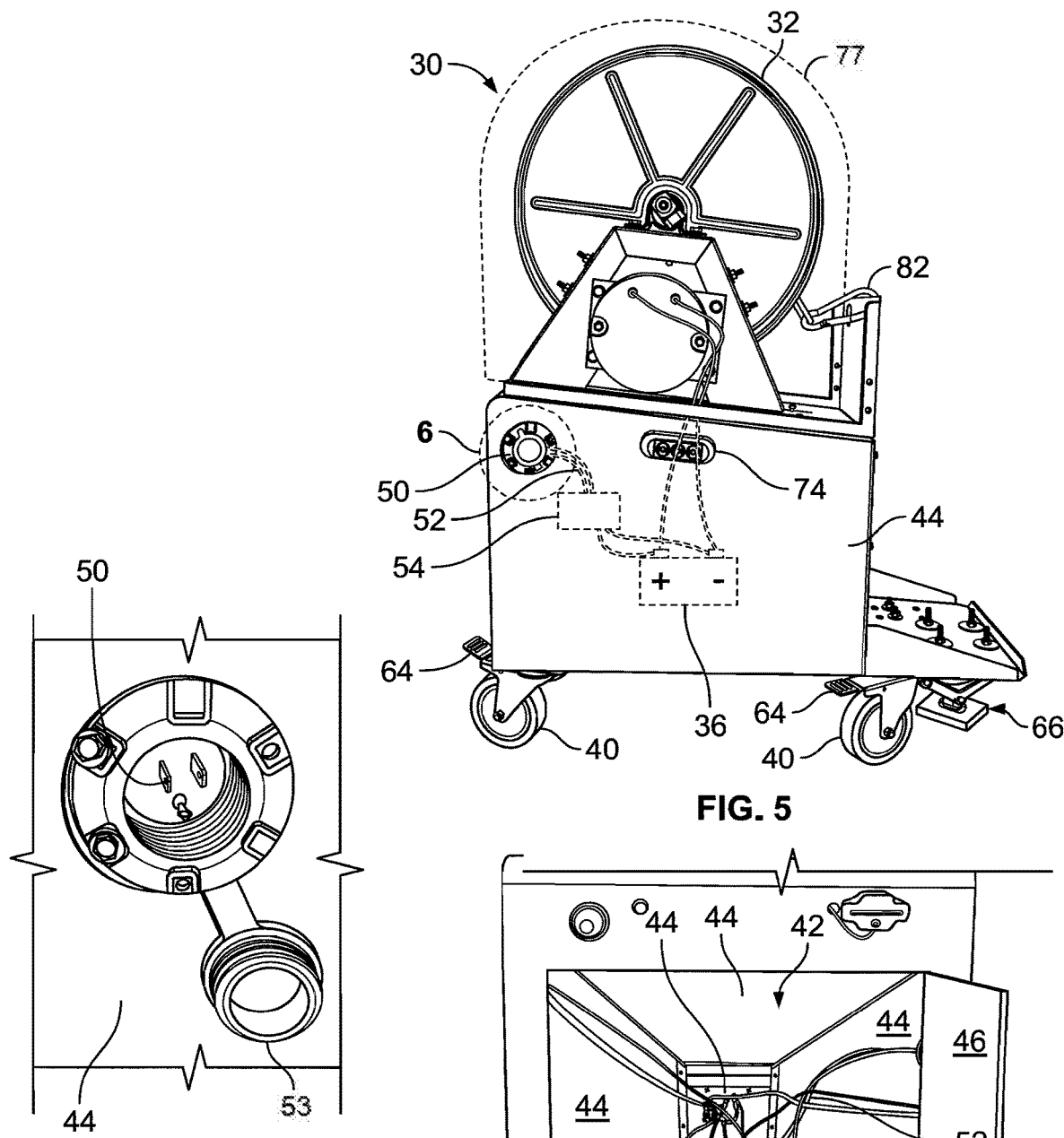
FIG. 5
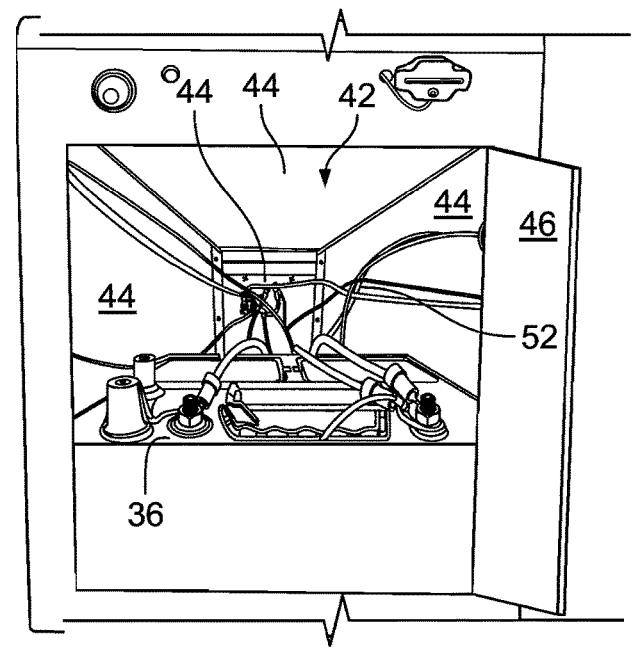
FIG. 6
FIG. 7

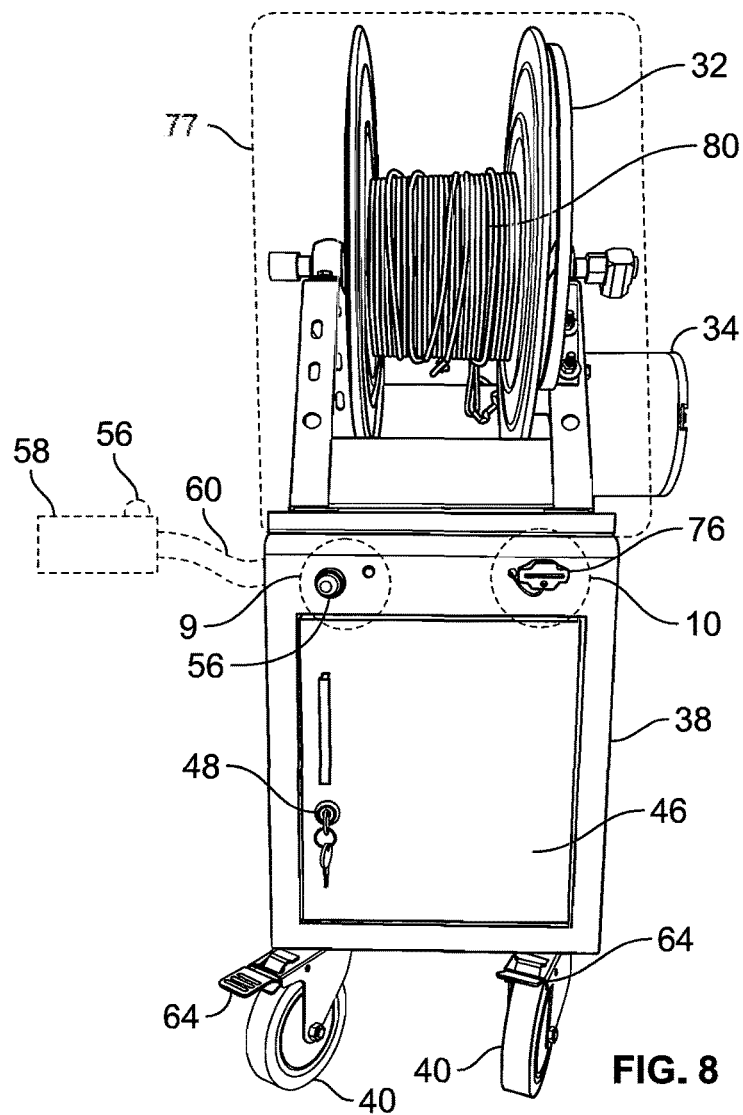
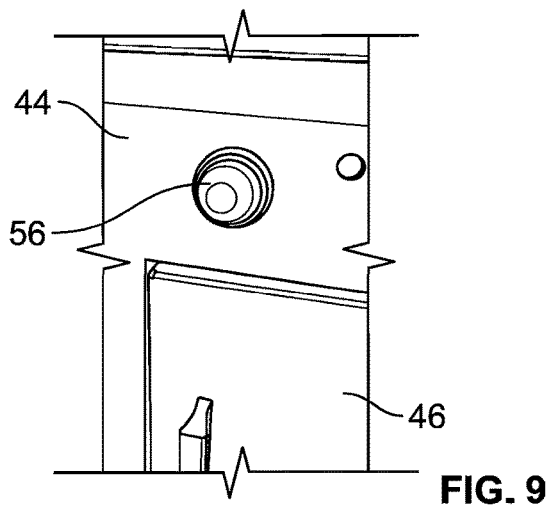
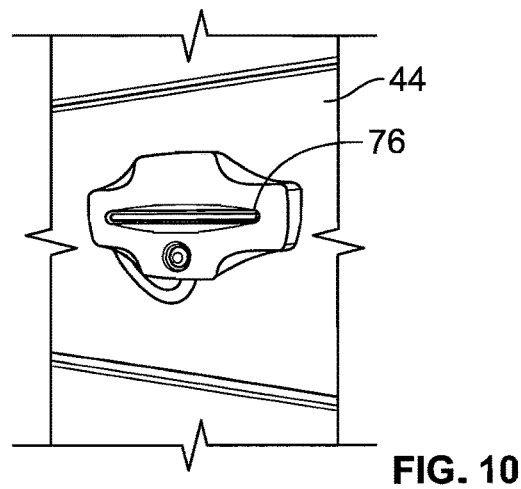
FIG. 8
FIG. 9
FIG. 10

CARGO BLANKET SPREADING APPARATUS AND METHOD

FIELD

This application relates generally to apparatus, equipment, and method suitable for spreading a cargo blanket over cargo loaded in a cargo container.

BACKGROUND

In the food industry, products are often transported in bulk by truck, for example from a factory to a warehouse or a retail location. For shipping, the product is typically packaged in small containers, such as boxes or cartons, that are suited for relatively easy moving by hand, and a number of the smaller containers are typically loaded onto a pallet for easy movement with a fork lift or similar equipment. These pallets are then typically loaded into an enclosed cargo container, such as the bed of a box truck or the trailer of a semi, from a door at the back end of the cargo container.

Sometimes, a cargo blanket must be spread over the top of the pallets or containers after they have been loaded into the cargo container. The cargo blanket may take any of numerous forms, such as an insulated cargo blanket or a tarpaulin or other similar flexible sheet of material. In one example, pallets of yogurt are covered with an insulated cargo blanket after being loaded into the cargo container of a container truck or a semi-trailer for temperature control during transport. Typically, the insulated cargo blanket is spread over the loaded cargo by hand, for example by placing a cargo blanket in a pre-folded condition on top of the cargo at the front end of the cargo container opposite the rear doors with a rope attached to it, and then pulling the rope by hand toward the rear of the cargo container through the rear doors to pull and spread the cargo blanket across the top of the loaded product containers.

A problem with this system, however, is that the cargo blanket frequently gets caught in cracks between the product containers and/or the pallets of product containers as the cargo blanket is pulled across the tops thereof. When this happens, typically the loaded cargo toward the rear doors is unloaded so that the cargo blanket can be accessed and released. Alternatively, someone may physically climb into the cargo container and crawl or walk across the product to free the caught cargo blanket so that it can again be pulled toward the rear doors across the remaining cargo. These problems can lead to inefficient loading and/or physical injury to the person pulling the rope to spread the cargo blanket, unloading and re-loading the product containers or pallets, or climbing across the cargo to free a caught cargo blanket.

Of course, this problem is not limited to the food industry or to trucking. Rather, the problems related to spreading a cargo blanket over loaded cargo in a cargo container may occur for any of a large number of different products, in different industries, and for different types of cargo containers.

It would be desirable to reduce, minimize, or even eliminate the problems described above with spreading a cargo blanket across loaded cargo in a cargo container.

SUMMARY

The systems, equipment, and methods disclosed hereinafter provide an improved way to spread a cargo blanket across loaded cargo in a cargo container that can overcome one or more of the afore-mentioned problems and thereby provide a safer and/or more efficient cargo loading process. The systems, equipment, and methods may be applied to any product, industry, or cargo container in which the need to spread a cargo blanket over the top loaded cargo from one end of the cargo container toward the opposite end of the cargo container arises.

According to some aspects, apparatus for covering product containers loaded in a cargo container is provided. The apparatus includes a cargo blanket. The cargo blanket may be disposed in a pre-folded condition ready to be unfolded and spread by pulling a leading each thereof. A cord may be coupled to the cargo blanket, the cord extending from the cargo blanket. An automated cord reel may be disposed at the back end of the container. The automated cord reel may include a spool and a motor configured to rotate the spool. The cord may be coupled to the spool. Activation of the motor rotates the spool and pulls the cord and the leading edge of the cargo blanket at a steady speed, thereby spreading the cargo blanket.

According to some aspects, an automated cord reel is provided for spreading a cargo blanket across cargo loaded in a cargo container to cover the cargo. The automated cord reel may include a spool configured to reel up a cord, a cart body supporting the spool and a motor operatively coupled to the spool to rotate the spool. Activation of the motor may rotate the spool to pull the cord at a steady speed. In this way, the automated cord reel can spread the cargo blanket over the top of the loaded cargo.

According to some aspects, a method of covering cargo loaded in a cargo container is provided. The cargo container may have a front end and a back end. A cargo blanket may be disposed on top of the cargo at the front end of the cargo container. The cargo blanket may be disposed in a pre-folded condition ready to be unfolded and spread across the top of the remaining cargo toward the back end of the cargo container. A cord may extend from a first end attached to a leading edge of the cargo blanket to a second end at the back end of the cargo container. The method may include the steps of locating an automated cord reel including a spool and a motor configured to rotate the spool in accordance with any of the arrangements disclosed herein in an operative position at the back end of the cargo container, coupling the second end of the cord to the spool, and activating the motor to spread the cargo blanket over the top of the loaded cargo. In the operative position, the spool is disposed to be able to pull the rope toward the back end of the cargo container. Activating the motor causes the spool to rotate and pull the cord and the cargo blanket toward the back end of the cargo container at a steady speed.

According to some aspects, a mobile work cart is provided with a magnetic floor brake. The mobile work cart and/or the magnetic floor brake may be incorporated as a part of the automated cord reel, or the mobile work cart and/or the magnetic floor brake may be implemented separately from the automated cord reel with other types of work pieces or in different mobile cart arrangements. In one exemplary arrangement, the mobile work cart includes a cart body configured to carry at least one work piece, a set of wheels disposed on a bottom side of the cart body, the set of wheels configured to support the body above a floor and to allow the body to be rolled across a floor, an electric power source carried by the cart body and configured to supply electric power, a switch operatively coupled with the electric power source to control supply of electric power to electric loads associated with the mobile work cart, and a magnetic floor brake coupled to the cart body. The magnetic floor brake may include a floor engagement member including an electro magnet. The floor engagement member may be selectively extendable and retractable from the cart body toward and away from the floor. The electro magnet is electrically coupled to the electric power source. When the switch is switched on, the electro magnet is energized by the electric power source. When the switch is switched off, the electro magnet is not energized. In this way, the electro magnet can magnetically couple the electro magnet with metal in the floor and thereby prevent the cart body from rolling on the wheels across the floor and when deenergized does not prevent the cart from moving across the floor.

Any one of these aspects and/or arrangements may further include any one or more of the following optional arrangements and/or features.

In some arrangements, the cargo may include product containers. The cargo container may have a front end and a back end and a loading opening through the back end. For example, the cargo container may be an enclosed trailer or open top trailer for a typical semi-truck or a box truck cargo hold or other types of cargo containers. The cargo blanket may be disposed on top of the product containers at the front end of the cargo container in a position suitable to be pulled and spread across product containers toward the back end of the cargo container. The cord may extend toward the back end of the cargo container. The cord may be flexible. Some non-limiting examples of a cord include one or more of a rope, a cable, a wire, a string, a thread, and a chain. Other forms of a cord may be used. The automated cord reel may be disposed at the back end of the cargo container. Activation of the motor may pull the leading edge of the cargo blanket toward the back end of the cargo container over the top of the loaded product containers.

In some arrangements, the motor may be an electric motor. The motor may be configured to rotate the spool at a substantially constant speed, such that the automated cord reel pulls the cargo blanket smoothly across the top of the cargo such that the cargo blanket does not fall into and catch on spaces between the cargo to prevent the cargo blanket from falling into and/or catch on spaces between the product containers.

In some arrangements, the automated cord reel may include a cart body and/or wheels. The spool may be mounted to the cart body. The wheels may be mounted to the cart body such that the automated cord reel can be rolled across a floor on the wheels with the spool disposed in an operative position spaced above the floor to pull the cord and the cargo blanket. The cart body may include walls that define an enclosed compartment. The enclosed compartment may include a door that provides access into the compartment.

In some arrangements, a battery may be configured to supply electrical power to the electric motor. The battery may be carried by the cart body. The battery may be disposed in an interior of the compartment. The battery may be or include a rechargeable battery. A battery charge indicator, such as a light or needle or other suitable visual indicator, may be provided that indicates the relative charge status of the battery, for example from fully charged to fully discharged and/or at continuous or at multiple levels ranging from anywhere between 100% charged and 0% charged.

In some arrangements, the cart body may include an electrical connector electrically coupled to the battery. The electrical connector may be configured to charge the battery when operatively coupled to a remote electrical power source. The electrical connector may be disposed on an exterior of the compartment and configured to operatively couple with a remote electrical power source. An AC-to-DC converter may be operatively interposed between the electrical connector and the battery to convert AC electrical power received at the electrical connector to DC power to supply to the battery.

In some arrangements, a power switch may be operatively coupled to the motor and configured to selectively activate and deactivate the motor when engaged by a user. The power switch may be fixed to the cart body, and/or the power switch may be fixed to a hand module that is not fixedly attached to the cart body. The power switch may include a switch actuator mounted on an exterior surface of the cart body. The switch actuator may include, for example, one or more of a push button, a throw switch handle, or a touch screen interface. The power switch may include a hand module that is not fixedly mounted to the cart body, and a switch actuator mounted to the hand module. An electrical whip may operatively connect the hand module with the motor. The electrical whip may be flexible such that the hand module may be separated and moved away from the cart body. Alternatively, the hand module may be configured to wirelessly activate and deactivate the motor, such as by a radio signal or other wireless transmitter. In this way, the switch actuator may be operated spaced remotely away from the cart body.

In some arrangements, the automated cord reel may include a brake system that is selectively engageable and disengageable by a user. When engaged, the brake system prevents the automated cord reel from rolling on the wheels across the floor. When disengaged, the brake system allows the automated cord reel to roll on the wheels freely across the floor. The brake system may include a wheel lock that directly engages at least one of the wheels to prevent the engaged wheel from freely rotating when engaged. The wheel lock when disengaged may not engage the wheel to allow the wheel to freely rotate. The brake system may include a floor brake including a floor engagement member, such as a pad or rod, wherein the floor engagement member is selectively extendable and retractable from the cart body toward and away from the floor. When engaged, the floor brake extends the floor engagement member downwardly from the cart body to engage the floor and prevent the automated cord reel from rolling on the wheels across the floor. When disengaged, the floor brake retracts the floor engagement member upwardly toward the cart body to disengage from the floor and allow the automated cord reel to roll on the wheels across the floor. The floor brake may include a jack that connects the floor engagement member to the cart body. The jack when extended may engage the floor engagement member with the floor, and when retracted may disengage the floor engagement member from the floor. In some arrangements, the brake system may include a wheel lock and a floor brake, which may be engageable independently of each other or in tandem. The brake system may include a magnetic floor brake having an electromagnet electrically coupled to an electric power source carried by the cart body and a switch operatively coupled with the electric power source to control supply of electric power to the electromagnet. The electromagnet may be selectively extendable and retractable from the cart body toward and away from the floor. When the switch is switched on, the electro magnet is energized by the electric power source to magnetically couple the electro magnet with metal in the floor and thereby prevent the cart body from rolling on the wheels across the floor. When the switch is switched off, the electro magnet is not energized. The brake system may be engaged before activating the motor to stabilize the automated cord reel in a selected operative position.

In some arrangements, a warning indicator may be configured to provide a warning signal indicative of operation of the spool. The warning indicator may include, for example, a warning light and/or an audible indicator that turns on when the motor is engaged and/or turns off when the motor is disengaged. In this way, the warning indicator may provide a warning signal to persons near the automated cord reel of operation of the motor and/or spool.

These and other aspects, arrangements, features, and/or technical effects will become apparent upon detailed inspection of the figures and the following description.

BRIEF DESCRIPTION OF THE DRAWINGS

FIG. 5 is a perspective view of the right side of the automated cord reel;

FIG. 6 is an enlarged detail view of an electrical connector visible in FIG. 5;

FIG. 7 is a perspective view of the interior of the enclosed cabinet portion of the cart body of the automated cord reel;

FIG. 8 is a perspective view of the rear side of the automated cord reel;

FIG. 9 is an enlarged detail view of a power switch on the rear side of the automated cord reel;

FIG. 10 is an enlarged detail view of a battery charge indicator on the rear side of the automated cord reel.

DETAILED DESCRIPTION

Figure 1:
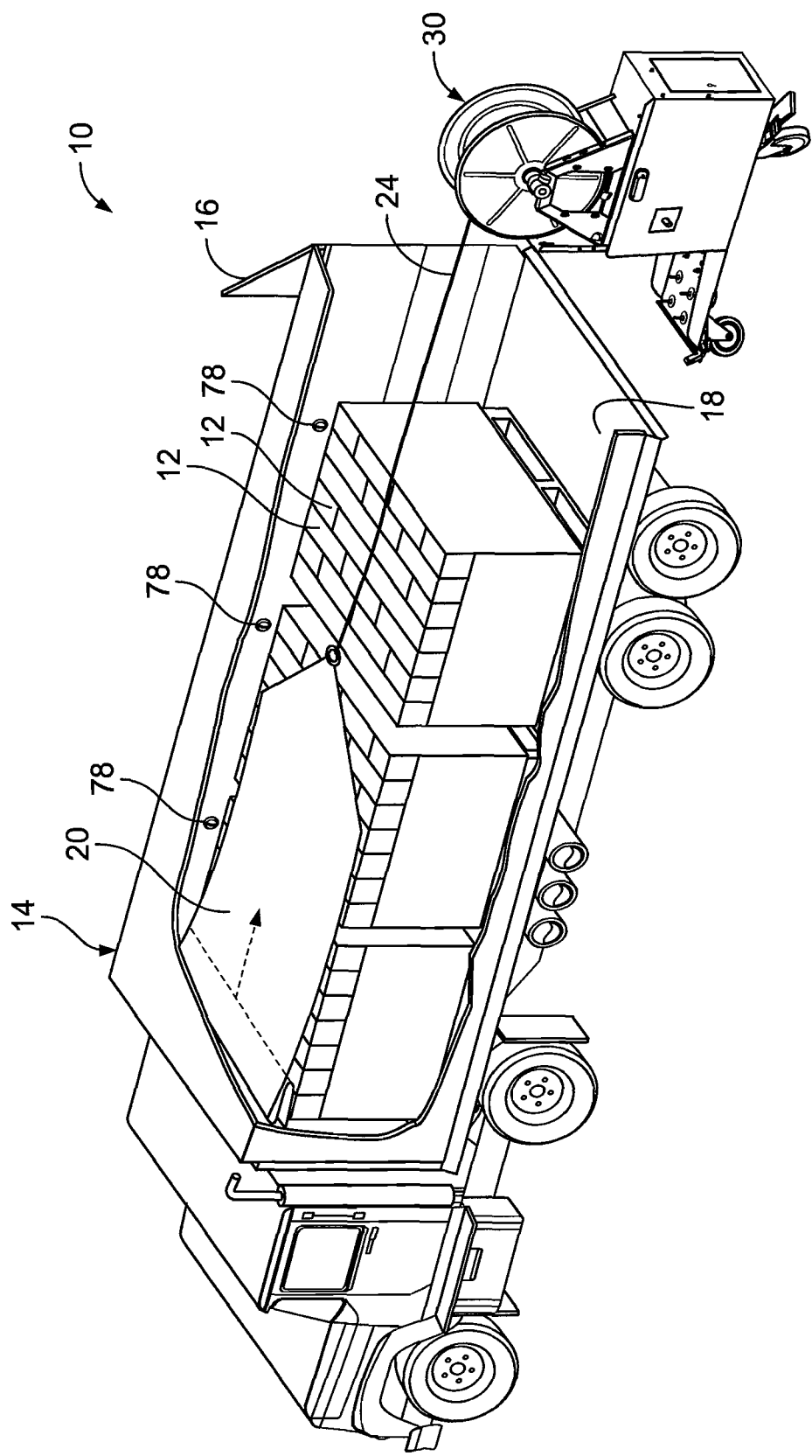
FIG. 1 is a perspective view of apparatus for spreading a cargo blanket over pallets of product containers loaded in a cargo container of a semi-truck trailer with outer walls of the cargo container in partial cutaway to show internal portions of the cargo container.

Turning now to the exemplary arrangements of the drawings, FIG. 1 shows apparatus 10 for covering cargo, such as product containers 12, loaded in a cargo container 14. In this example, the cargo container 14 is an enclosed trailer for a typical semi-truck having an elongate bed extending from a front end to a back end, side walls extending upwardly from opposite sides of the bed, a top wall connecting the top ends of the two side walls, a front wall at the front end of the bed, and a door 16 to close a loading opening 18 through the back end of the trailer. However, the apparatus 10 is not limited to use with this particular type of cargo container, and rather may be used with any cargo container to which the functioning described hereinafter could be suitably used. For example, and without limitation, the cargo container 14 could alternatively be an inter-modal shipping container, an open top trailer, a box truck cargo hold, a rail car, the cargo hold in a ship or in an aircraft, or practically any other type of similar cargo container in which a cargo blanket may need to be spread across loaded product containers.

The apparatus 10 in this example includes a cargo blanket 20, a cord 24, and an automated cord reel 30. The cargo blanket 20 may take any of many different forms, such as a thermal blanket, a tarp, or similar structure, and is typically a flexible or semi-flexible sheet material that can be easily spread and folded and unfolded. The cargo blanket 20 is initially placed in a pre-folded condition on top of one or more pallets of product containers 12 at the front end of the cargo container 14. In this arrangement, the cargo blanket 20 is ready to be unfolded and spread across the top of the remaining product containers 12 toward the back end of the cargo container 14 simply by pulling the leading edge of the cargo blanket 20 toward the back end of the cargo container 14.

The cord 24 is attached at a first end to the leading edge of the cargo blanket 20, for example at a connector such as a metal ring located in the center of the leading edge of the cargo blanket. The second end of the cord 24 extends toward the back end of the cargo container 14 such that it may be operatively connected to the automated cord reel 30. The cord 24 may take almost any suitable form. Typically, the cord 24 is an elongate flexible member, such as a rope, cable, wire, string, thread, or chain, or any combination thereof. The cord 24 optionally may be suitable for being rolled up onto a spool.

The automated cord reel 30, as best seen in FIGS. 1, 2, 5, and 8, is configured to spread the cargo blanket 20 across the top of the product containers 12 in an automated manner, which eliminates the need of heretofore known systems for a person to manually spread the cargo blanket by pulling on the cord 24. In this way, the automated cord reel 30 may reduce or prevent injuries to loading dock workers and/or increase the efficiency of the loading process. In addition, the automated cord reel 30 is configured to pull the cord 24 with a very smooth and/or even motion, preferably at a substantially constant speed, which reduces or eliminates the tendency for the leading edge of the cargo blanket 20 to catch in cracks or crevices between the product containers 12 or other cargo as it is pulled across the tops thereof. In this way, the automated cord reel may further improve the efficiency and/or reduce risk of injury to dock loading workers by reducing the need to unload and reload product containers or climb over the product containers in the event the cargo blanket snags.

In the present arrangement of the apparatus 10, the automated cord reel is shown disposed in an operative position at the back end of the cargo container 14, coupled to the second end of the cord 24, and having pulled the cargo blanket 20 part-way from the folded position at the front end of the cargo container toward the rear end across the top of the pallets of product containers 12. However, the automated cord reel 30 may be operated in other positions relative to the cargo container 14 and the product containers 12 or other cargo depending upon the particular layout and arrangement thereof, in any manner suitable for covering the cargo with the cargo blanket.

The automated cord reel 30 includes a spool 32 and a motor 34. The motor 34 is operatively coupled to the spool 32, for example by a gear drive or belt drive arrangement suitable for rotating the spool on its axis. The motor 34 is configured to rotate the spool to achieve the smooth and even pulling of the cargo blanket 20 as described previously. Typically, the motor 34 is configured to rotate the spool 32 at a constant or substantially constant rotational speed. However, in other arrangements, the motor 34 may be configured to rotate spool 32 at some variable speed designed to improve the smoothness and evenness of draw of the cargo blanket 20 and/or otherwise prevent the cargo blanket 20 from catching are snagging against product containers 12 or other cargo as it is spread thereacross. Typically, the motor 34 is or includes an electric motor, although in some arrangements, the motor 34 could be or include a hydraulic or a pneumatic motor or a motor having some other some other power source configured for rotating the spool 32 as described herein. Further, the motor 34 could be an AC powered motor and/or a DC powered motor. In the present example, the motor 34 is a DC electric motor.

The automated cord reel 30 in this exemplary arrangement is configured as a mobile unit to be easily moved by a user around a loading dock area, for example to be moved into an operating position when it is time to spread the cargo blanket 20 over the product containers 12 and thereafter to be moved back into a storage position out of the loading dock area when not in use. To facilitate this mobility, the automated cord reel 30 further includes a cart body 38 and a set of one or more wheels 40. The spool 32 is mounted to a top of the cart body 38, preferably although not necessarily in a permanent or fixed position thereon. The wheels 40 are mounted to a bottom of the cart body 38. In the operative position, the wheels 40 are disposed on the floor of the loading dock with the spool 32 disposed on top of the cart body 38 and spaced apart upwardly from the floor. In this arrangement, the automated cord reel 30 may be easily moved into and out of a selected operating position by rolling the entire unit on the wheels 40 across the floor. However, the automated cord reel 30 need not be configured as a mobile unit, and rather may be configured to be attached or affixed to a single position in the loading dock area, such as being mounted to a wall or to a fixed position on the loading dock floor, in which case, any one or more of the wheels 40 and/or the cart body 38 may be omitted.

As shown in FIG. 7, at least one battery 36 is operatively coupled to the motor 34 to provide appropriate DC electric power to drive the motor. The battery 36 may take any form suitable for providing driving power to the motor 34. For example, the battery 36 may be a typical 12V or 6V automotive battery or another type of battery sufficient to power the motor 34 and/or other electrical loads associated with the automated cord reel 30. Optionally, more than one battery 36 may be provided. Preferably, the battery 36 is a rechargeable battery; however, in other arrangements the battery 36 may be a non-rechargeable battery. The battery 36 is carried by the cart body 38 as an integral part of the overall mobile unit of the automated cord reel 30. In the present arrangement, the battery 36 is disposed inside an enclosed cabinet 42 defined by top, side, and bottom walls 44 of the cart body 38. A door 46 in a rear side wall 44 of the cart body 38 allows access to the battery 36 and may be opened and shut selectively by a user. Optionally, a door lock 48 may be provided for the door 46 so the door 46 can be locked in the closed position. However, the battery 36 may be disposed in a different arrangement on the cart body 38. In some arrangements, other types of power sources may be provided for powering the motor 34, which may supplement or replace the battery 36.

As shown in FIG. 6, an electrical connector 50 is disposed on the cart body 38 and configured to allow easy recharging of the battery 36. The electrical connector 50 is operatively connected to the battery 36, for example with suitable wiring 52, and is arranged for access and coupling to a remote power source, such as a power cord from a battery charger, building or plant electricity, or some other electrical source suitable for recharging the battery 36. In this arrangement, the electrical connector 50 is disposed in one of the walls 44 of the cabinet 42 and arranged on the exterior side of the cabinet 42 to be plugged into by a complementary plug of an electrical power cord. Optionally, a removable cover 53 is provided to cover the electrical connector 50 when not in use. The removable cover 53 is in the form of a plug that fits into a socket surrounding the electrical connector 50.

An AC-to-DC converter 54 is optionally provided to allow the battery 36 to be recharged from an AC power source connected to the electrical connector 50. The AC-to-DC converter 54 is operably disposed between the electrical connector 50 and the battery 36, for example by being operatively connected along the wiring 52 extending from the electrical connector 50 to the battery 36. The AC-to-DC converter 54 is configured to convert AC power received at the electrical connector 50 into suitable DC power for recharging the battery 36. In other arrangements however, the AC-to-DC converter 54 may be omitted, for example, if the battery 36 is not a rechargeable battery, or if the electrical connector 50 is configured for connection to a DC power source, or if the battery 36 is to be coupled directly to a DC power source, such as a charger, for example through the door 46.

A power switch 56 is operatively coupled to the motor 34 for turning the motor 34 on and/or off. The power switch 56 is arranged to be operated by a user with relative ease. In the exemplary arrangement shown in FIGS. 8 and 9, the power switch 56 is mounted to an exterior surface of the cart body 38, such as to one of the walls 44, so that a user may easily engage the power switch 56 to operate the motor 34 and the spool 32. The power switch 56 may have a switch actuator of any suitable form, such as a push button switch as shown in FIG. 9 or a toggle switch or a touchscreen switch, and so on. In some arrangements, the power switch 56 may also be operatively connected with other electrical loads associated with the cart to also turn other equipment on and/or off. In some arrangements, the power switch 56 may be operatively configured to control power supply to all electrical loads associated with the automated cord reel 30 and thereby act as a main on/off power control for the entire automated cord reel 30.

In another arrangement shown in dashed lines in FIG. 8, the power switch 56 may include a hand module 58 with the switch actuator mounted to the hand module. The hand module 58 may be moved around relative to the cart body 38 so that the power switch 56 may be operated remote from the cart body for easier manipulation by user. In this arrangement, an electrical whip 60 connects the hand module 58 to the cart body 38. Preferably, the electrical whip 60 is flexible and the hand module 58 is not fixedly mounted to the cart body 38 so that the switch actuator may be operated remote from the cart body 38. Alternatively, the electrical whip 60 may be omitted and the hand module 58 may have a wireless signal transmitter or transceiver, such as a radio transmitter or transceiver, to wirelessly couple the power switch 56 with the motor 34 to turn the motor 34 on and/or off.

Figure 2:
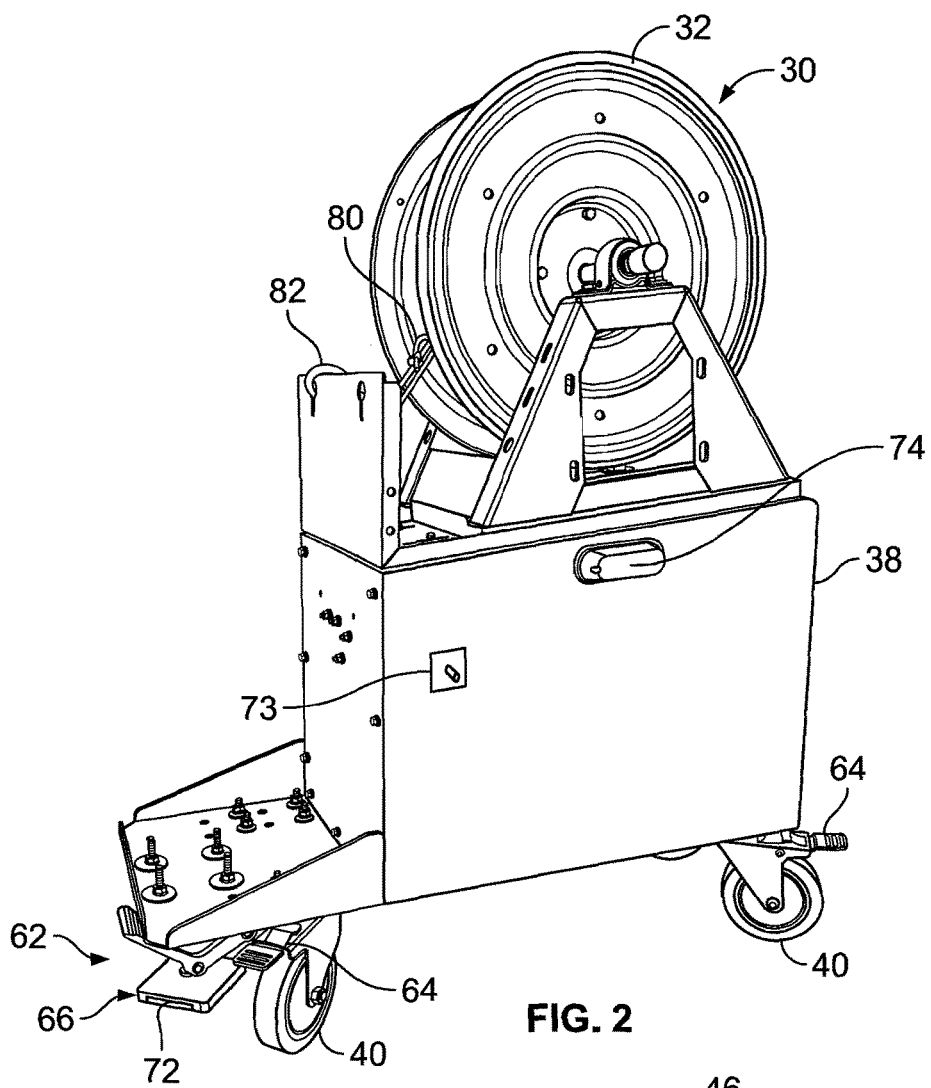
FIG. 2 is a perspective view of the left side of an automated cord reel shown in FIG. 1 according to one exemplary arrangement of the present disclosure.
Figure 3:
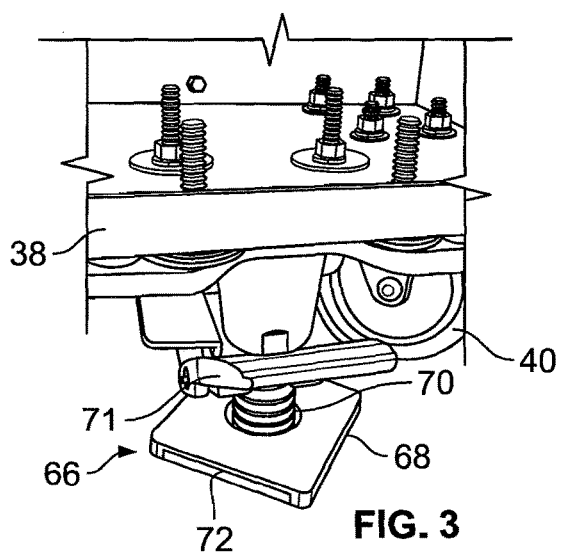
FIG. 3 is an enlarged detail view of a floor brake of the automated cord reel.
Figure 4:
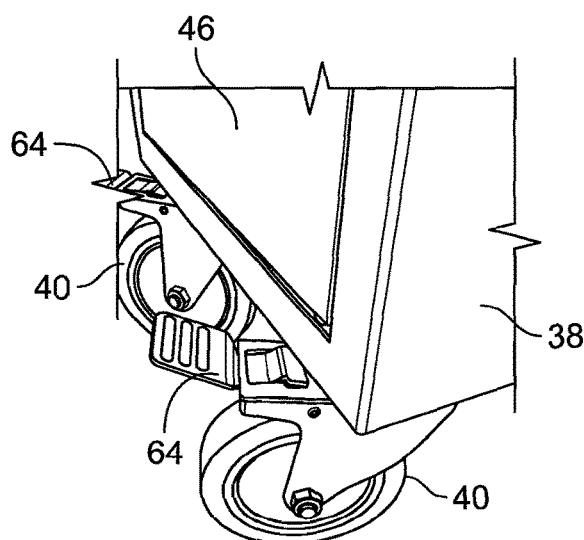
FIG. 4 is an enlarged detail view of a wheel lock of the automated cord reel.

As most clearly seen in FIGS. 2, 3, and 4, a brake system 62 is optionally provided that is selectively engageable by a user to prevent the automated cord reel 30 from undesired rolling and movement, for example, during operation to spread the cargo cover 14, and then to be disengaged so that the cart body 38 can be easily rolled across the floor on the wheels 40. When engaged, the brake system 62 prevents the automated cord reel 30 from rolling on the wheels 40 across the floor. Likewise, when disengaged, the brake system 62 allows the automated cord reel 30 to roll on the wheels 40 freely across the floor. The example shown in the figures includes three different types of brake systems, namely, a wheel lock 64, a floor brake 66, and a magnetic floor brake. In other arrangements, any one or more of these brake systems may be included individually or in any combination thereof, and other types of brake systems could also be used.

In this arrangement, the wheel lock 64 is independently actuated from the floor brake 66 and the magnetic floor brake. However, in other arrangements, the wheel lock 64 and the floor brake 66 could be operatively connected with each other so as to engage and disengage in tandem with each other, for example by a suitable mechanical and/or electrical linkage.

As best seen in FIG. 4, the wheel lock 64 may take any suitable form, such as a brake pad that is selectively engaged directly against one of the wheels 40 prevent the wheel from rotating. Preferably, each of the wheels 40 includes a separate and independently actuable wheel lock 64, so that each wheel 40 may be locked and/or unlocked independently from the other wheels.

As best seen in FIG. 3, the floor brake 66 includes a floor engagement member 68 configured to be engaged against the floor to prevent the automated cord reel 30 from shifting across the floor and further configured to be disengaged apart from the floor to allow the automated cord reel 30 to shift across the floor. The floor engagement member 68 may take any suitable form to develop sufficient braking friction against the floor, such as a pad or post. Optionally, the floor brake 66 may also slightly lift the cart body 38 and one or more of the wheels 40 off of the floor to provide an even stronger braking action. The floor brake 66 also includes a jack 70 that connects the floor engagement pad 68 to the cart body 38 such that the jack may be extended downwardly to engage the floor engagement member against the floor and the jack may be retracted upwardly to disengage the floor engagement member from the floor. Preferably, a foot pedal 71 is operatively connected to the jack 70 to extend the jack. The foot pedal 71 may also include a releasable lock, such as a cam lock or other releasable lock, to secure the jack 70 and the floor engagement member 68 in its extended position. However, the floor brake 66 may include other mechanisms for extending and retracting and/or locking the floor engagement member 68 toward and away from the floor and need not be limited to the use of the jack 70.

In some arrangements, the brake system 62 is includes a magnetic floor brake, wherein at least one electromagnet 72 is selectively actuable to magnetically engage with ferrous material, such as in the floor, to prevent the cart body 38 from moving across the floor. In some arrangements, the magnetic floor brake includes two or more electromagnets 72. The electromagnet 72 is electrically coupled to an electric power source carried by the cart body 38. In this example, the electromagnet 72 is electrically coupled to the battery 36. In other arrangements, the electromagnet 72 may be electrically coupled to a different power source, such as an AC power source supplied to the cart body 38. The electromagnet 72 preferably provides a magnetic field strength sufficient to prevent the cart body 38 from rolling across the floor when the spool 32 is being actuated to pull the cargo blanket 20 independently from the other brake systems. In one example, the electromagnet 72 creates 1200 pounds of magnetic force with a metal in the floor, such as a plate or a dock leveler, when activated; however other magnetic strengths may be implemented.

In the exemplary arrangement of FIG. 3, the magnetic floor brake is incorporated into the form of the floor brake 66, such that the floor engagement member 68 is selectively extendable and retractable toward and away from the cart body and the floor with the jack 70 and the foot pedal 71 as described previously. The electromagnet 72 forms and/or is carried by the floor engagement member 64. Preferably, the electromagnet 72 is disposed on or near the bottom surface of the floor engagement member 64 to provide a strong magnetic coupling to a piece of metal secured to the floor, such as a portion of a dock leveler or a metal plate coupled to the floor or even steel reinforcing bars in the floor. However, the magnetic floor brake is not limited to being implemented as part of the floor brake 66, but rather may be implemented separately from the floor brake 66.

The magnetic floor brake is coupled to the cart body 38 such that the cart body 38 cannot rolling across the floor separately from the electromagnet 72. In this arrangement, the jack 70 so couples the electromagnet 72 with the cart body 38; however other coupling mechanisms may be used.

A switch 73 is electrically coupled to the electric power source and configured to control the supply of electric power to the electromagnet 72. In some arrangements, the switch 73 is configured to control the supply of electric power to other power loads on the automated cord reel 30, such as the motor 34 and other lights and indicators, and thereby act as a main on/off power switch for the entire automated cord reel 30. The switch 73 may be fixed to the cart body 38, as shown in FIG. 2, and/or the switch 73 may be fixed to a handheld module that is not fixedly attached to the cart body 38, such as the handheld module 58. When the switch 73 is turned on, the electromagnet 72 is energized by the electric power source, and when the switch 73 is turned off, the electromagnet 72 is de-energized. In this way, the electromagnet 72 when energized can magnetically couple to ferrous material in the floor, such as a portion of a dock leveler or a metal plate installed in the floor or any other ferrous material on the surface of floor, and thereby prevent the cart body 38 from freely rolling on the wheels 40 across the floor.

The magnetic floor brake in some arrangements may be implemented separately from the automated cord reel 30, for example as part of a mobile work cart configure to carry one or more different types of workpieces other than the spool 32 and motor 34 combination. When so implemented, such a mobile work cart preferably includes a cart body, such as the cart body 38 or other type of body configured for carrying a different type of work piece, a set of the wheels 40 supporting the cart body, an electric power source, such as the battery 36, and the switch 73. Other workpieces may be carried by and/or associated with the mobile work cart, such as any one or more the features of the automated cord reel 30 described herein and/or other items, depending on the intended use thereof. In any event, the magnetic floor brake described herein provides a convenient and effective system for holding a mobile work cart such as the automated cord reel 30 in a desired position on a floor when desired and for allowing the mobile work cart to freely roll across the floor when otherwise desired.

Various indicators are also provided to improve the ease of use of the automated cord reel 30 by a user. For example, one or more warning indicators 74 as shown in FIGS. 2 and 5 may optionally be provided to warn people in the vicinity of the automated cord reel 30 when the spool 32 is activated. The warning indicators 74 may be visual indicators, such as blinking lights, and/or audible indicators, such as a horn or buzzer. Preferably, the warning indicators 74 are operatively connected to the motor 34 and/or battery 36 and/or spool 32 to provide a warning indication when the spool 32 is being driven by the motor 34 and to turn off when the spool is not being driven by the motor 34. Another optional indicator best seen in FIGS. 8 and 10 is a battery charge indicator 76, which is configured to provide a visual indication to a user of the relative charge of the battery 36. For example, the battery charge indicator 76 may include a needle readout or a light readout or a screen readout that shows varying amounts of charge of the battery from empty or 0% charged to full or 100% charged. In this arrangement, each of the warning indicators 74 and the battery charge indicator 76 are mounted on the exterior side of the rear side wall 44 of the cart body 38. However, other suitable mounting arrangements bay be used.

As shown in dotted lines in FIGS. 5 and 8, a safety covering, such as a cowl 77 is optionally provided that covers and/or at least partially encloses the spool 32 to prevent, for example, items of clothing or users' fingers from being accidentally pinched or grabbed by moving parts of the spool 32 during operation. The cowl 77 may be removably attached or permanently attached to the support for the spool 32, such as at the top of the cart body 38. Preferably, the cowl 77 includes an opening through which the cord 24 can be reeled onto the spool 32.

Turning again to FIG. 1, operation of the apparatus 10 to cover the product containers 12 in the cargo container 14 may proceed in many different ways, and the following method of operation is only one exemplary way, it being understood that other ways of operating the apparatus 10 are also possible. Using the semi-truck shown in FIG. 1 as a reference example, in a typical loading and/or unloading position, the back end of the cargo container 14 is backed into a loading dock that has a floor surface approximately level with the bed of the cargo container, and the opening 18 of the cargo container abuts the edge of the floor of the loading dock. In this position, it is typically easiest to load and/or unload product containers 12 either individually or on pallets as shown in FIG. 1.

With the empty cargo container 14 in the loading position, a first set of product containers 12, for example one or two pallets of product containers, is loaded onto the bed of the cargo container 14 at the front end of the cargo container. The cargo blanket 20 is then placed on top of the product containers 12 loaded at the front and of the cargo container 14 before additional product containers are loaded onto the truck. Typically, this is done manually by one or two loading personnel, and the cargo blanket 20 is arranged in a folded position across the width of the front end of the front product containers. Sometimes, the cargo blanket 20 is provided in a pre-folded arrangement from the manufacturer, and sometimes the cargo blanket 20 must be manually folded or pre-folded by the loading personnel. Regardless, the cargo blanket 20, in its initial folded position, is arranged such that the leading edge to which the cord 24 is to be attached is disposed on the top fold. In this position, the cargo blanket 20 can be subsequently pulled toward the back end of the container and spread across additional product containers extending from the front end of the cargo container 14 to the back end. Typically, before additional product containers 12 are loaded, the front end of the cord 24 is connected to the leading edge of the cargo blanket 20, for example at a ring or other connector, and the cord 24 is extended toward the opening 18 and hung on releasable restraints 78 along one of the side walls of the cargo container 14 elevated so as to be out of the way of the loading of additional product containers into the cargo container 14. The releasable restraints 78 may take any suitable for releasably retaining the cord 24, such as releasable hooks, tape, or hook and loop fasteners.

With the cargo blanket initially arranged on top of the front product containers 12, additional product containers 12, for example loaded on additional pallets as shown in FIG. 1, are loaded onto the bed of the cargo container 14 extending from the front and of the bed to the back end of the bed.

With the bed of the cargo container 14 loaded, the automated cord reel 30 is located in an operative position at the back end of the cargo container 14 suitable to pull the cord 24. In the mobile arrangement of the automated cord reel 30, this may include rolling the automated cord reel 30 on the wheels 40 across the floor from some storage position remote from the cargo container 14 to a position directly behind the opening 18 of the cargo container 14. The automated cord reel 30 may be arranged with the floor brake 66 adjacent the opening 18 of the cargo container 14 so that the floor brake 66 is disposed between the cargo blanket 20 and the spool 32 in order to provide a more stable brake engagement against the floor. Once in the desired operating position behind the opening 18, the brake system 62 of the automated cord reel 30 may be engaged, for example, by engaging any one or more of the floor brake 66 and/or the wheel locks 64 and/or the electromagnet 73, to prevent the automated cord reel 30 from undesired rolling and/or moving during subsequent operation of the spool 32. In other arrangements of the automated cord reel 30, for example in an arrangement that does not include the mobile cart body 38 on wheels 40, the automated cord reel 30 is mounted in a fixed position somewhere in the vicinity of the loading dock near where the opening 18 of the cargo container 14 will be during loading, such as on a wall or the floor of the loading dock area. In such case, locating the automated cord reel 30 may simply include ensuring that the spool 32 is arranged in a position ready to be connected to the cord 24.

The rear end of the cord 24 is then operatively attached to the spool 32 such that the cord 24 will be pulled toward and/or rolled up on to the spool 32 when the spool 32 is rotated. In one arrangement, a second cord 80 is attached to and at least partially rolled up onto the spool 32 and includes a latch 82 at its free and for latching to the rear end of the cord 24. Preferably, the spool 32 has a one directional drive configured to rotate the spool 32 in a roll up direction, for example when actuated by the motor 34, and configured to rotate easily in the opposite, unroll direction so that a dock worker can easily pull and unroll the second cord 80 when the spool 32 is not being activated. In this arrangement, the dock worker pulls the second cord 80 to unroll the spool 32 and attaches the latch 82 to the rear end of the cord 24. However, in other arrangements, the cord 24 could be fastened directly to the spool 32 or some other arrangement of attaching the cord 24 to the spool 32 sufficient to allow the spool to pull the cord 24 may be used.

Thus operatively connected to the cord 24 and secured in the desired operating position, a user may now activate the motor 34 to spread the cargo blanket 20. The user engages the switch 56 to active the motor 34, which rotates the spool 32 and pulls the cord 24 and the leading edge of the cargo blanket 20 toward the rear end of the cargo container 14. When thus pulled, the cord 24 pulls away and releases from the releasable cord restraints 78. In the present example, typically only the second cord 80 is reeled back onto the spool 32, although in some arrangements a portion of the cord 24 may also be wound on to the spool 32. As the cord 24 is pulled by the cord reel 30, the cargo blanket 20 unfolds from its pre-folded position across the top of the product containers 12, thereby spreading the cargo blanket 20 across the top of the product containers extending from the front end of the cargo container for the back end.

When the cargo blanket 20 is fully extended and covering the rear most product containers 12, the user may disengage the motor 34, for example by turning off the power switch 56, to stop rotation of the spool 32. The cord 24 may then be released from the cargo blanket 20 and from the spool 32.

In the mobile arrangement of the automated cord reel 30 the brake system 62 may then be disengaged, and the automated cord reel may be rolled to a storage location.

This detailed description is to be construed as examples only and does not describe every possible embodiment, as describing every possible embodiment would be impractical, if not impossible. One could implement numerous alternate embodiments, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

We claim:

1. Apparatus for covering cargo loaded in a cargo container, comprising:
   a cargo blanket disposed in a pre-folded condition suitable to be unfolded and spread by pulling a leading edge thereof;
   a cord coupled to the cargo blanket, the cord extending from the cargo blanket; and
   an automated cord reel comprising a spool and a motor configured to rotate the spool,
   wherein the cord is coupled to the spool, and
   wherein activation of the motor rotates the spool and pulls the cord and the leading edge of the cargo blanket at a steady speed, thereby spreading the cargo blanket.

2. The apparatus of claim 1, wherein the motor rotates the spool at a substantially constant speed, and wherein the automated cord reel pulls the cargo blanket smoothly.

3. The apparatus of claim 1, wherein the automated cord reel further comprises a cart body and wheels, wherein the spool is mounted to the cart body, and wherein the wheels are mounted to the cart body such that the automated cord reel can be rolled across a floor on the wheels with the spool disposed in an operative position spaced above the floor to pull the cord and the cargo blanket.

4. The apparatus of claim 3, wherein the motor is an electric motor, and further comprising a battery carried by the cart body, wherein the battery supplies electrical power to the electric motor.

5. An automated cord reel configured to spread a cargo blanket across cargo loaded in a cargo container to cover the cargo, the automated cord reel comprising:
   a spool configured to reel up a cord;
   a cart body supporting the spool; and
   a motor operatively coupled to the spool to rotate the spool;
   wherein activation of the motor rotates the spool to reel the cord at a steady speed, whereby the automated cord reel can spread the cargo blanket across the loaded cargo.

6. The automated cord reel of claim 5, wherein the motor comprises an electric motor, and further comprising a battery carried by the cart body, wherein the battery supplies electrical power to the electric motor, wherein the electric motor rotates the spool at a substantially constant speed, whereby the automated cord reel is configured to pull the cargo blanket smoothly across the top of the cargo such that the cargo blanket does not fall into and catch on spaces between the cargo.

7. The automated cord reel of claim 6, wherein the battery comprises a rechargeable battery.

8. The automated cord reel of claim 7, wherein the cart body comprises an electrical connector electrically coupled to the battery, and wherein the electrical connector is configured to charge the battery when operatively coupled to a remote electrical power source.

9. The automated cord reel of claim 8, wherein the cart body comprises walls that define an enclosed compartment and a door that provides access into the compartment, wherein the battery is disposed in an interior of the compartment, and wherein the electrical connector is disposed on an exterior of the compartment and configured to operatively couple with a remote electrical power source.

10. The automated cord reel of claim 8, further comprising an AC-to-DC converter, wherein the AC-to-DC converter s operatively interposed between the electrical connector and the battery and configured to convert AC electrical power received at the electrical connector to DC power to supply to the battery.

11. The automated cord reel of claim 5, further comprising a power switch operatively coupled to the motor and configured to selectively activate and deactivate the motor when engaged by a user.

12. The automated cord reel of claim 11, wherein the power switch comprises a switch actuator mounted on an exterior surface of the cart body.

13. The automated cord reel of claim 11, further comprising a hand module that is not fixedly attached to the cart body, wherein the power switch comprises a switch actuator carried by the hand module.

14. The automated cord reel of claim 5, further comprising wheels, wherein the spool is mounted to the cart body, and wherein the wheels are mounted to the cart body such that the automated cord reel can be rolled across a floor on the wheels with the spool disposed in an operative position above the floor to reel the cord.

15. The automated cord reel of claim 14, wherein the cart body comprises a brake system that is selectively engageable and disengageable by a user, wherein the brake system when engaged by a user prevents the automated cord reel from rolling on the wheels across the floor, and wherein the brake system when disengaged allows the automated cord reel to roll on the wheels freely across the floor.

16. The automated cord reel of claim 15, wherein the brake system comprises a wheel lock that when engaged directly engages at least one of the wheels to prevent the engaged wheel from freely rotating and when disengaged does not engage the wheel to allow the wheel to freely rotate.

17. The automated cord reel of claim 15, wherein the brake system comprises a floor brake including a floor engagement member, wherein the floor engagement member is selectively extendable and retractable from the cart body toward and away from the floor, wherein the floor brake when engaged extends the floor engagement member downwardly from the cart body to engage the floor and prevent the automated cord reel from rolling on the wheels across the floor, and wherein the floor brake when disengaged retracts the floor engagement member upwardly toward the cart body to disengage from the floor and allow the automated cord reel to roll on the wheels across the floor.

18. The automated cord reel of claim 15, wherein the brake system comprises a wheel lock and a floor brake, and wherein the wheel lock and the floor brake are engageable independently of each other.

19. The automated cord reel of claim 15, wherein the brake system comprises a magnetic floor brake comprising:
   an electromagnet electrically coupled to an electric power source carried by the cart body, wherein the electromagnet is selectively extendable and retractable from the cart body toward and away from the floor; and a switch operatively coupled with the electric power source to control supply of electric power to the electromagnet;

wherein when the switch is switched on, the electro magnet is energized by the electric power source to magnetically couple the electro magnet with metal in the floor and thereby prevent the cart body from rolling on the wheels across the floor, and wherein when the switch is switched off, the electro magnet is not energized.

20. The automated cord reel of claim 5, further comprising a warning indicator configured to provide a warning signal indicative of operation of the spool.

21. The automated cord reel of claim 6, further comprising a battery charge indicator that visually indicates the charge status of the battery.

22. A method of covering cargo loaded in a cargo container, the cargo container having a front end and a back end, a cargo blanket disposed on top of the cargo at the front end of the cargo container, the cargo blanket being in a prefolded condition ready to be unfolded and spread across the top of the cargo toward the back end of the cargo container; and a cord extending from a first end coupled to a leading edge of the cargo blanket to a second end at the back end of the cargo container, the method comprising:

locating an automated cord reel in an operative position at the back end of the cargo container, wherein the automated cord reel comprises a spool and a motor configured to rotate the spool, wherein in the operative position, the spool is disposed to be able to pull the rope toward the back end of the cargo container;

coupling the second end of the cord with the spool;

activating the motor, wherein activating the motor causes the spool to rotate and pull the cord and the cargo blanket toward the back end of the cargo container at a steady speed, thereby spreading the cargo blanket over the top of the loaded cargo.

23. The method of claim 22, wherein the automated cord reel comprises a cart body supporting the spool, wheels supporting the cart body, and a brake system configured to prevent the automated cord reel from rolling freely on the wheels, the method further comprising the step of:

engaging the brake system before activating the motor to stabilize the automated cord reel in the operative position.

24. A mobile work cart, comprising:

a cart body configured to carry at least one work piece;

a set of wheels disposed on a bottom side of the cart body, the set of wheels configured to support the body above a floor and to allow the body to be rolled across a floor;

an electric power source carried by the cart body, wherein the electric power source is configured to supply electric power;

a switch operatively coupled with the electric power source to control supply of electric power to electric loads associated with the mobile work cart; and a magnetic floor brake coupled to the cart body, the magnetic floor brake including a floor engagement member comprising an electro magnet, wherein the floor engagement member is selectively extendable and retractable from the cart body toward and away from the floor, wherein the electro magnet is electrically coupled to the electric power source, and wherein when the switch is switched on, the electro magnet is energized by the electric power source, and wherein when the switch is switched off, the electro magnet is not energized.

25. The mobile work cart of claim 24, wherein the electric power source comprises a battery.

26. The mobile work cart of claim 24, wherein the switch is fixed to the cart body.

27. The mobile work cart of claim 24, wherein the switch is fixed to a hand module that is not fixedly attached to the cart body.

28. The mobile work cart of claim 24, further comprising a work piece comprising:

a spool mounted on the cart body; and a motor;

wherein the motor is operatively coupled to the spool to rotate the spool, and wherein activation of the motor rotates the spool.

29. The mobile work cart of claim 28, further comprising:

a second switch operatively coupled to the motor to selectively control supply of power to the motor.

* * * * *